(12) United States Patent
Johnson et al.

(10) Patent No.: US 7,885,948 B2
(45) Date of Patent: Feb. 8, 2011

(54) AUTOMATICALLY MANAGING INCOMING COMMUNICATIONS BETWEEN SENDER AND RECIPIENT, ANALYZING FACTORS, SELECTIVELY APPLYING OBSERVED BEHAVIOR, PERFORMING DESIGNATED ACTION

(75) Inventors: Bruce Johnson, Woodinville, WA (US); Anoop Gupta, Woodinville, WA (US); Mary P. Czerwinski, Woodinville, WA (US); Pavel Curtis, Bellevue, WA (US); Richard J. McAniff, Bellevue, WA (US); Raymond E. Ozzie, Seattle, WA (US); Roger S. Barga, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 11/770,669

(22) Filed: Jun. 28, 2007

(65) Prior Publication Data

US 2009/0006366 A1 Jan. 1, 2009

(51) Int. Cl.
*G06F 17/30* (2006.01)
*G06F 3/00* (2006.01)
(52) U.S. Cl. .............. 707/705; 707/749; 707/758; 715/752

(58) Field of Classification Search .......... 707/1–2, 707/10, 100, 102, 104.1, 200, 204–205, 609, 707/705–710, 723, 732, 748–749, 758; 709/218–224, 709/206–207, 203; 715/751–753; 379/8
See application file for complete search history.

(56) References Cited

U.S. PATENT DOCUMENTS 5,377,354 A 12/1994 Scannell et al.
(Continued)

FOREIGN PATENT DOCUMENTS

WO 9964972 A2 12/1999
(Continued)

OTHER PUBLICATIONS

Irene Koprinska et al. "Learning to classify e-mail", Information Sciences: an International Journal, vol. 177, Issue 10 (May 2007), pp. 2-26.*

(Continued)

*Primary Examiner*—Srirama Channavajjala
(74) *Attorney, Agent, or Firm*—Lee & Hayes, PLLC

(57) ABSTRACT

As incoming communications are received, a priority or significance level can be assigned to each communication. A communication determined to have a high priority can be presented to a user at substantially the same time as receiving the communication. A communication having a low priority can be placed in a low priority folder or flagged differently from a high priority communication (e.g., different color-coding). Behavior of a user as it relates to a received communication can be observed for learning purposes or to modify one or more classifications or priority levels.

11 Claims, 10 Drawing Sheets

U.S. PATENT DOCUMENTS

| | | | |
|---|---|---|---|
| 5,966,714 A * | 10/1999 | Huang et al. .................... 1/1 |
| 5,999,932 A * | 12/1999 | Paul ................................. 1/1 |
| 6,119,114 A | 9/2000 | Smadja | |
| 6,147,977 A * | 11/2000 | Thro et al. .................. 370/265 |
| 6,363,415 B1 * | 3/2002 | Finney et al. ............... 709/206 |
| 6,418,440 B1 * | 7/2002 | Kuo et al. ........................ 1/1 |
| 6,442,503 B1 * | 8/2002 | Bengala ...................... 702/156 |
| 6,499,021 B1 * | 12/2002 | Abu-Hakima ................ 706/10 |
| 6,654,791 B1 | 11/2003 | Bates et al. | |
| 6,832,245 B1 | 12/2004 | Isaacs et al. | |
| 6,983,308 B1 * | 1/2006 | Oberhaus et al. ............ 709/206 |
| 7,167,255 B1 * | 1/2007 | Mikami et al. .............. 358/1.15 |
| 7,194,681 B1 | 3/2007 | Horvitz | |
| 7,783,706 B1 * | 8/2010 | Robinson ..................... 709/206 |
| 2002/0120705 A1 * | 8/2002 | Schiavone et al. ........... 709/207 |
| 2003/0195937 A1 * | 10/2003 | Kircher et al. .............. 709/207 |
| 2004/0003352 A1 * | 1/2004 | Bargeron et al. ............ 715/530 |
| 2004/0054737 A1 * | 3/2004 | Daniell ........................ 709/206 |
| 2004/0143636 A1 * | 7/2004 | Horvitz et al. .............. 709/207 |
| 2004/0148330 A1 * | 7/2004 | Alspector et al. ........... 709/200 |
| 2005/0060186 A1 * | 3/2005 | Blowers et al. ................ 705/2 |
| 2005/0144571 A1 * | 6/2005 | Loverin et al. .............. 715/822 |
| 2005/0188038 A1 * | 8/2005 | Yabe ........................... 709/206 |
| 2005/0204001 A1 * | 9/2005 | Stein et al. .................. 709/206 |
| 2005/0204009 A1 * | 9/2005 | Hazarika et al. ............ 709/206 |
| 2006/0010217 A1 * | 1/2006 | Sood ........................... 709/206 |
| 2006/0080393 A1 * | 4/2006 | Cardone et al. ............. 709/206 |
| 2006/0173824 A1 * | 8/2006 | Bensky et al. .................. 707/3 |
| 2006/0230117 A1 * | 10/2006 | Gross et al. ................. 709/207 |
| 2007/0100603 A1 * | 5/2007 | Warner et al. .................. 704/9 |
| 2007/0168315 A1 | 7/2007 | Covannon et al. | |
| 2007/0179945 A1 | 8/2007 | Marston et al. | |
| 2008/0172466 A1 * | 7/2008 | Tonegawa et al. ........... 709/206 |

FOREIGN PATENT DOCUMENTS

| WO | WO 2004/053720 | * | 6/2004 |
| WO | WO 2004/066527 | * | 8/2004 |
| WO | WO 2008/097811 | * | 8/2008 |

OTHER PUBLICATIONS

Sung-Shun Weng et al. "Using text classification and multiple concepts to answer e-mails", Expert Systems with Applications 26 (2004) 529-543.*

Shinya Kambori et al. "Keyword Definition on E-mail-based Information Utilization System", IEEE 2009, pp. 325-330.*

Terry R. Payne, et al. Interface Agents that Learn: An Investigation of Learning Issues in a Mail Agent Interface. Oct. 26, 1995. http://citeseer.ist.psu.edu/cache/papers/cs/45/http:zSzzSzwww-ai.cs.uni-dortmund.dezSzLEHREzSzAGENTEN97zSzSeminar_PaperszSz-Edwards_Interface_Agents_that_Learn.pdf/payne95interface.pdf.

Anthony Jameson. Adaptive Interfaces and Agents. http://www.cs.ubc.ca/~conati/532b/papers/handbook-chapter-jameson.pdf. Last accessed on Sep. 4, 2007.

Ion Androutsopoulos, et al. Learning to Filter Unsolicited Commercial E-Mail. NCSR "Demokritos" Technical Report, No. 2004/2, Mar. 2004 revised: Oct. 2004; minor corrections: Oct. 2006. http://www.aueb.gr/users/ion/docs/TR2004_updated.pdf.

William W. Cohen. Learning Rules that Classify E-Mail. http://citeseer.ist.psu.edu/cache/papers/cs/1118/http:zSzzSzportal.research.bell-labs.comzSzorgszSzssrzSzpeoplezSzwcohenzSzpostscriptzSz-aaai-ss-96.pdf/cohen96learning.pdf. Last accessed on Sep. 4, 2007.

* cited by examiner

AUTOMATICALLY MANAGING INCOMING COMMUNICATIONS BETWEEN SENDER AND RECIPIENT, ANALYZING FACTORS, SELECTIVELY APPLYING OBSERVED BEHAVIOR, PERFORMING DESIGNATED ACTION

BACKGROUND

Individuals commonly utilize computing devices to communicate with one or more contacts on a daily basis. Various functions, such as instant message applications or email applications are generally used instead of calling a person on the telephone or physically going to see someone. Such information exchange can occur when a person enters information (e.g., text, visual, audio, and so on) into a display area of a device and communicates with the one or more contacts in a back-and-forth manner without using a telephone or other method of communication. This almost instantaneous communication can allow a user and various contacts in disparate locations or even within the same office to communicate in a real time fashion.

There can be a proliferation of incoming communications (e.g., email, text messages and so forth) and a single individual can receive hundreds of communications in a single day. With this enormous amount of incoming information, it can be difficult to determine which communications are important and should be handled in a reasonable amount of time compared with those that are not as important and can be disregarded for a while. Additionally, the individual receiving the incoming communications has tasks and other duties to perform and might not have much time available for reviewing each incoming communication. As such, a user can unintentionally overlook an important email and might have to deal with the consequences of such actions.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with providing priority ranking and selective presentation of incoming communications. The innovation provides automatic significance tagging to rank incoming communications depending on an inferred importance (e.g., hotness) of that communication. The tagging can be based on historical data relating to the receiver and/or sender of the information. Historical data can take into consideration the amount of time a user has historically spent reading a similar or related communication (e.g., 1 second is not important but if over 30 seconds, it is considered important). The historical data can also be based on how the user deals with the ranking (e.g., manually changing or overriding a system ranking). In accordance with some aspects, tagging can be based on keywords or phrases in the subject line and/or body of the communication or through a user instruction (e.g., mark as significant any email received from Mr. X). Other tagging can be based on the person who sent the communication (e.g., boss versus coworker) or the person receiving the communication (e.g., subordinate).

The incoming communication can be ranked (e.g., high/low) based upon the tagging of the communication. Thus, communications with a low ranking (not important) can be flagged as such (e.g., placed in a special folder or location, highlighted a different color) and the communications with a high-ranking (important) can be flagged as important. Such ranking can allow a user to proactively receive and respond to important incoming communications while mitigating the amount of time spent on unimportant communications.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
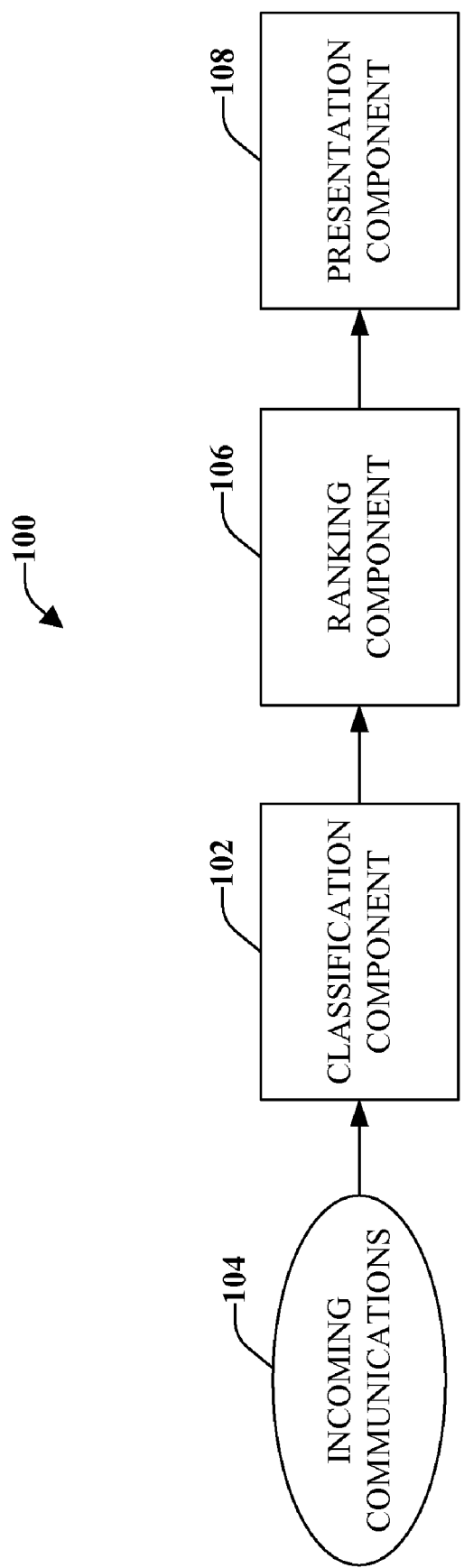
FIG. 1 illustrates an example system that automatically assigns significance levels to incoming communications.

Referring initially to FIG. 1, illustrated is an example system 100 that automatically assigns significance levels to incoming communications. Many people receive emails or other communications for both personal and business reasons. At times, the incoming communications are manageable and the recipient can handle each one individually. However, sometimes the volume of incoming communications is such that dealing with the situation gets out of control. For example, if an individual takes a vacation, whether it is for a few days or a week, upon returning there can be hundreds, if not thousands, of emails received during the week. The enormous task of reading each email and dealing with it accordingly can be quite daunting. System 100 can help manage this task by assigning significance levels to each incoming communication at substantially the same time as system 100 receives the communication. Thus, upon returning from vacation or other absence, an individual can begin with the highest ranked items and, as time permits, progress to the lower ranked items, making the task more manageable.

In further detail, system 100 includes a classification component 102 that can be configured to receive one or more incoming communications 104 and assign a label or tag to each communication based on a determined importance level. Different criteria can be utilized to establish a level of importance. Examples of criteria include historical data relating to the sender and/or receiver of the communication, time spent reviewing similar emails, how the recipient of the communication has dealt with importance levels or priorities in the past, keywords or phrases in the subject and/or body of the communication, a user instruction, or combinations thereof. Additionally or alternatively, the criteria can relate to the recipient's position within an address line (e.g., "To", "Cc", "Bcc") included in the communication.

In accordance with some aspects, classification component 102 can enter an instruction period, which can last from a few hours or days to a few weeks, or longer. During the instruction period, the recipient can mark each received communication as important or not important. Other rankings can include, but are not limited to, semi-important, moderately important, need to review, junk, spam, etc. According to some aspects, the recipient can add individualized rankings or labels, depending on personal interests.

A ranking component 106 can be configured to receive the incoming communication 104 and its associated tag and classify or prioritize the communication. If the communication is important, an output component 108 can present the communication to a user at about the same time as receipt. If classification component 102 deems the communication as not important, output component 108 can place the communication in a separate location or mark it as not important. Thus, the recipient can attend to the more important communications in a timely manner and can deal with less important communications at a better time, such as when the recipient is not busy.

Figure 2:
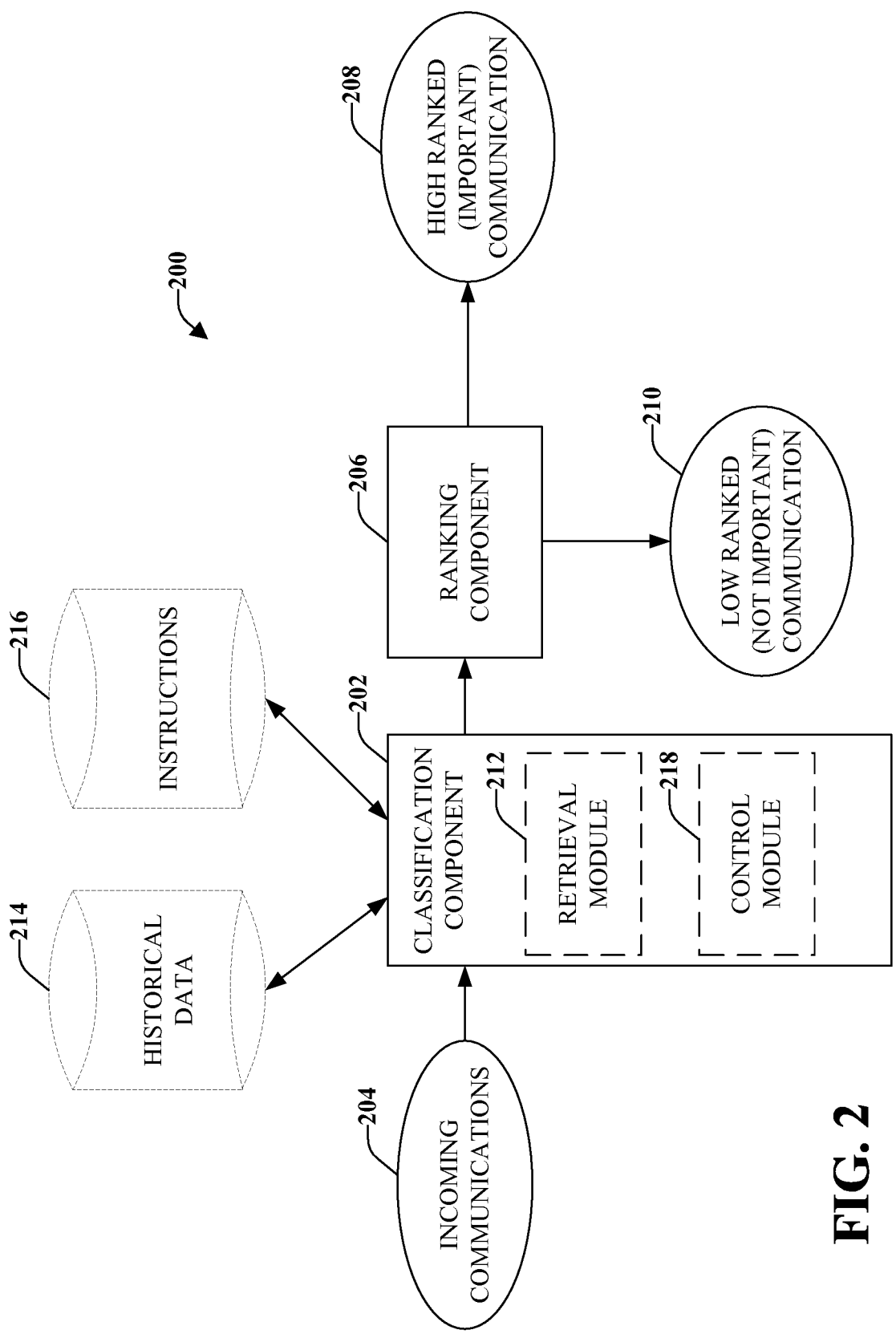
FIG. 2 illustrates an example system that categorizes incoming communications and dynamically distributes the communications.

FIG. 2 illustrates an example system 200 that categorizes incoming communications and dynamically distributes the communications. Due to needs or interests, a recipient of a communication might be more interested in some communications and less interested in other communications. System 200 can be configured to automatically categorize the communications based on the individualized needs or interests of the recipient. If the needs or interests change, system 200 can be dynamically updated to apply different standards for categorizing the incoming communications.

System 200 includes a classification component 202 that can tag incoming communications 204 based on the individual requirements of the recipient. Additionally or alternatively, classification component 202 can tag each incoming communication 204 based on its relevance to the recipient. Based in part on the tag assigned by classification component 202, a ranking component 206 can prioritize each incoming communication 204 based on the significance of each communication to the recipient. Such prioritization can be a number scale ranking, or another type of ranking. For example, a ranking scale of "1" to "10" can be utilized where "1" is a low priority item and "10" is a high priority item, although other scales can be utilized as determined by system 200 or as assigned by recipient.

An important incoming communication can be given a high-ranking 208 and presented to the recipient at substantially the same time as it is received. An incoming communication that is not deemed important can be given a low-ranking 210 and retained in a separate location for later review. In accordance with some aspects, color coding, highlighting or other readily perceivable means can be utilized to notify the recipient of the relative ranking of each communication.

Classification component 202 can include a retrieval module 212 that can be configured to retrieve information related to each incoming communication 204 in order to obtain tagging criteria. Related information can be maintained as historical data 214 and can be selectively accessed by retrieval module 212. Historical data 214 can include information such as how the recipient handled similar communications in the past. Similar communications can be determined based on the sender of the communication, a domain from which the communication was sent, keywords or phrases in a subject line or body of the communication, a sender of the information, and other factors indicating that two or more communications are similar.

For example, if upon receipt of a previous communication that contained the subject line "Summer Party" the communications was immediately deleted by the recipient without reading (e.g., an email was not "opened" before deleting), the historical data 214 might indicate that the recipient does not want these communications, or such communications are not important. On the other hand, if communications with the subject line "Assigned Task" are replied to within a short amount of time and/or marked for follow-up, it can indicate that such communications are very important.

Retrieval module 212 can also obtain information relating to instructions 216 applied by recipient. Such instructions 216 can relate to information included in the incoming communication (e.g., sender, keywords or phrases). For example, an instruction might be that incoming communications with the keyword "Sweepstakes" are important. Another instruction might be that communications with the keywords "Youth Council" are not important and/or if the sender is "Nancy Graham", the communication is not important. Another instruction might be whether the recipient was on the "To" address line and, if so, the communication might be important. If the recipient is on the "Cc" or "Bcc" line, the instructions 216 might indicate to ignore the communication. In accordance with some aspects, the position of the recipient within the address lines (e.g., "To", "Cc", "Bcc") might indicate a color-coding to apply to the communication. The instructions 216 can be dynamically change over time as the interests of the recipient changes.

Based on the historical information 214 and/or instructions 216, a control module 218 can selectively specify a classification range or parameters in addition to the tag or indicator. For example, the historical data indicates that the communication is not important (e.g., previous communications from the sender were deleted without reading) but user instructions indicate that a communication containing (e.g., body or subject) a certain keyword or phrase is important. Control module 218 can selectively categorize that communication as being a higher category than not important but a somewhat lower category than important (e.g., a medium level category).

Ranking component 206 can receive the categorization and tag and make a determination of the relative ranking of the communication as compared to other received communications. For example, if numerous communications are given similar "important" tags by classification component 202 and other communications are given a different tag, indicating medium level priority, such as that described in the above example, the medium tag might be considered not as important in ranking as compared to the important tagged communications.

Thus, system 200 can selectively determine a tagging or categorization and ranking based on incoming communications and selectively present the communications based on an assigned priority. Important communications (e.g., high ranking) 208 can be presented to the user at substantially the same time as receipt (e.g., notification, color-coding, and so forth). Lower ranked communications 210 can be retained and not presented to the recipient or presented only upon request. Dynamically presenting only communications inferred as important can mitigate the number of communications that a recipient needs to review on a daily basis and can also allow some communications to be disregarded depending on a confidence level of system 200.

Figure 3:
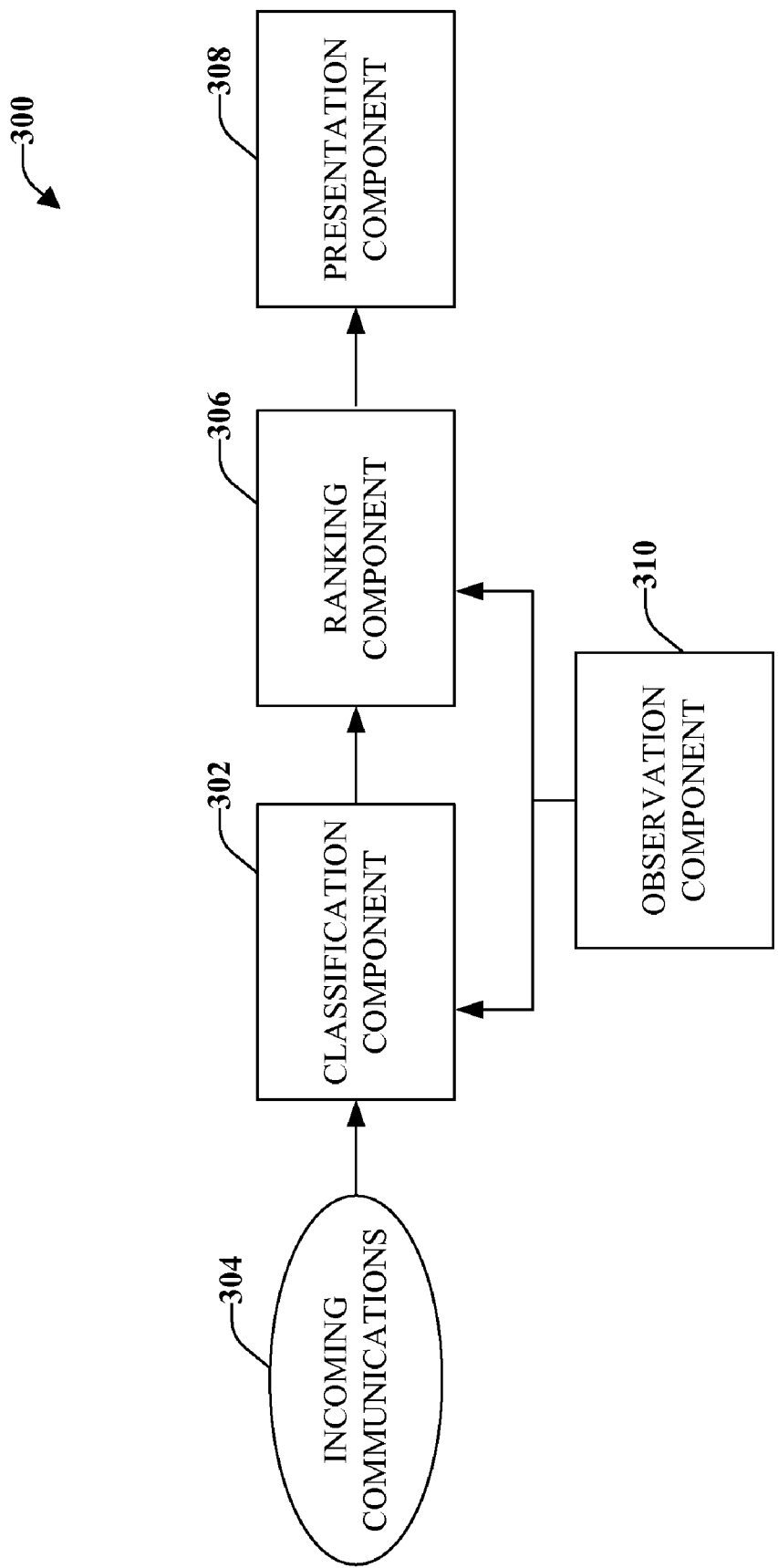
FIG. 3 illustrates a system for monitoring actions of a recipient to improve effectiveness of applying a significance level to incoming communications.

With reference now to FIG. 3, illustrated is a system 300 for monitoring actions of a recipient to improve effectiveness of applying a significance level to incoming communications. Each individual recipient has different requirements relating to receipt of communications and such requirements might change over time. System 300 can monitor a recipient's actions as part of a training phase, as well as over time, to determine if categorization tagging and ranking of incoming communications should be modified.

System 300 includes a classification component 302 that can receive one or more incoming communications 304 and classify the communications with a tag or other indicator based on information known about the recipient's habits, instructions or other actions as it relates to incoming communications. A ranking component 306 can rank each communication based on the tags of other received communications and a presentation component 308 can output the communication based on its relative ranking or priority level. The output can be visually or audibly presented, provided the recipient of important communications is notified at substantially the same time as the communication is received.

To establish various criteria relating to categorization and/or ranking, system 300 can enter or initiate a training phase, whereby a recipient deals with each incoming communication for a few hours, days, weeks, etc. An observation component 310 can be configured to monitor the recipient's actions, which should be the same actions a recipient would take if not being monitored. Observation component 310 can further be configured to analyze the actions and make a determination why such actions were made. Such analysis can consider information included in the communication (e.g., sender, subject, keywords, phrases, and so forth). If observation component 310 detects a pattern, it can indicate a relationship between the recipient and the communication. For example, each time a communication is received from Janet Jones, it is immediately opened and replied to (or another action taken). Observation component 310 can infer that there is a relationship between the recipient and Janet Jones (e.g., co-workers, boss/employee and so forth) and future communications from Janet Jones can be marked as important. Thus, actions of the recipient can increase system 300 performance and efficiency while mitigating the need for assigning explicit instructions.

In accordance with some aspects, observation component 310 can monitor other actions of the recipient, such as how much time is spent reviewing each communication. For example, if the communication is opened and a user spends less than ten seconds reviewing the document, it might be inferred that the information contained in the communication is not important. However if the user spends a longer time (e.g., 20 to 30 seconds or more) looking at the document, it might be inferred that the communication is important. Other parameters can be utilized in conjunction with inference of what the gaze of the user might indicate. A parameter could be the length of the communication. If the communication is short (e.g., one or two lines), it might take only a couple of seconds to read but the communication might be very important. If a communication is longer or the content is complex, or does not make sense, it might take longer to read and an ultimate determination might be that the communication is not important at all. Another parameter can be the sender of the communication (e.g., if the sender is important, it does not matter how long recipient takes to review a communication). Other parameters includes keywords, phrases, subject lines and so forth, that might be used in conjunction with the length of time a user spends reviewing a communication as applied to its overall importance.

In accordance with some aspects, observation component 310 can consider further parameters relating to the amount of time a user spends reviewing a communication. For example, the communication is open on the user's device and the user is performing another task (e.g., talking on the phone, reviewing a hardcopy of a document, not near the device, or out of the office and so on) and left the page open. In this scenario, the amount of time that the communication is open might no longer be relevant to the importance of the communication.

Figure 4:
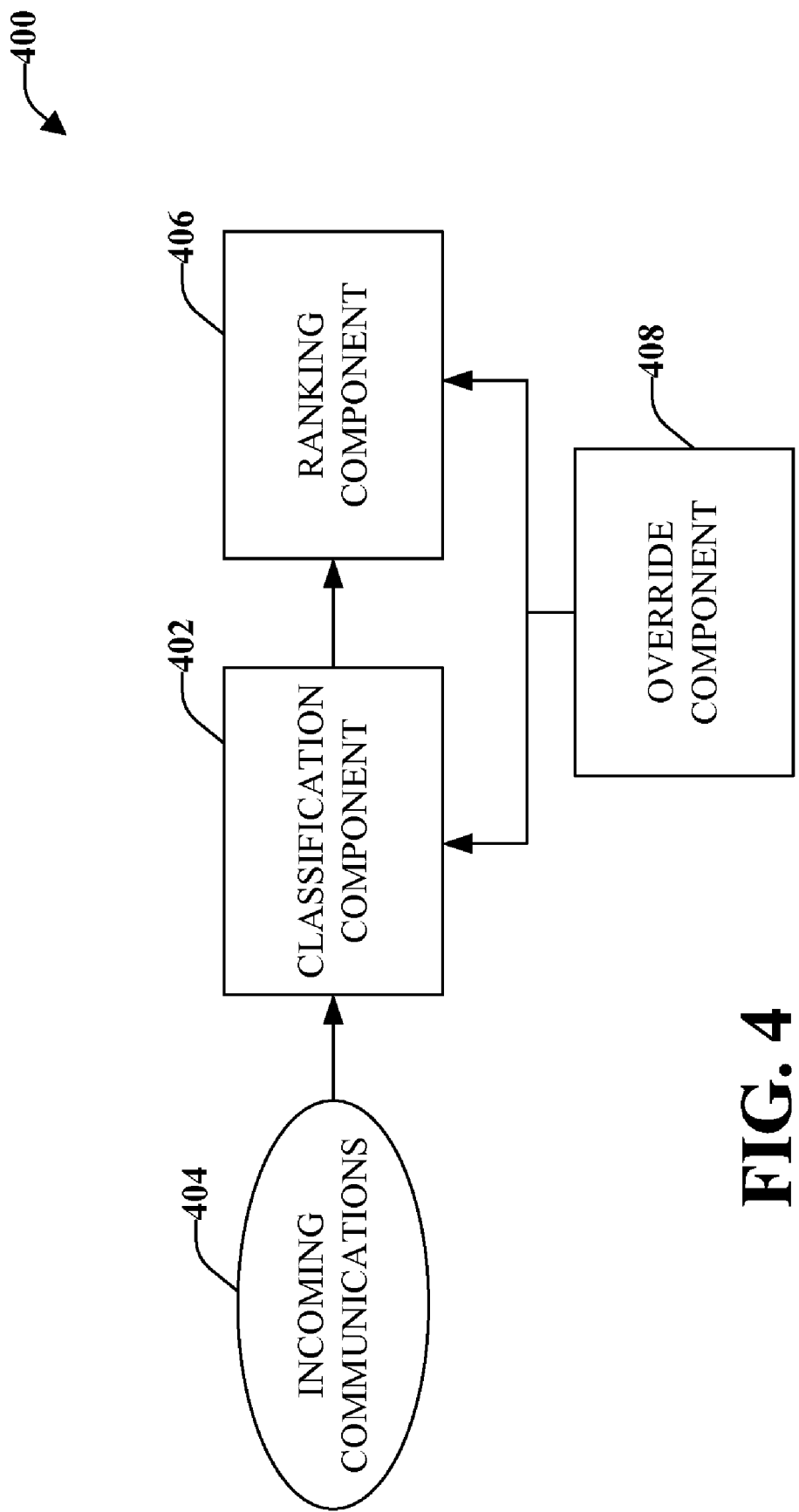
FIG. 4 illustrates another example system for monitoring actions of a recipient in order to modify or correct significance rankings of incoming communications.

FIG. 4 illustrates another example system 400 for monitoring actions of a recipient in order to modify or correct significance rankings of incoming communications. System 400 can perform an initial ranking on an incoming communication and monitor the recipient's actions based on that ranking. If the ranking is not acceptable, system 400 can dynamically alter one or more parameters relating to the classification and/or ranking so that the recipient's needs are more closely met.

System 400 is similar to the system of FIG. 3, and includes a classification component 402 that categorizes or tags one or more incoming communications 404 based on known information about the recipient and/or how the recipient has historically dealt with similar communications. The categorization can also be based on instructions or other historical data. A ranking component 406 can prioritize the communications based on the categorization and the relationship of each communication to the other communications received.

An override component 408 can be included in system 400 that can allow the recipient to manually override or change a ranking or a priority of an incoming communication, such as by raising the ranking to a higher, or the highest priority level (or lowering to a lower priority level). Subsequent communications that are related and/or similar to the communication whose ranking was changed can automatically be assigned the new ranking. The ranking might be manually changed due to changes in the recipients' needs or interests. Some rankings might be changed because the system 400 made the wrong inference. Additionally or alternatively, system 400 can immediate promote (or demote) all similar and/or related communications that might be have been placed in a lower (or higher) priority queue (e.g., communications that were previously received). By observing changes in the applied rankings, system 400 can continuously learn and increase efficiency of assigning various significance levels to incoming communications. Thus, the changing nature of user priorities or interests should have an immediate effect on related and/or similar communications, no matter when such communications were received (past and future).

Override component 408 can provide a user interface to allow the user to enter a modified classification or ranking directly into the user interface. The user interface can provide a graphical user interface (GUI), a command line interface, a speech interface, Natural Language text interface, and the like. For example, a GUI can be rendered that provides a user with a region or means to read, make modifications to, or perform other actions to various classifications or rankings associated with a current communication or a different (e.g., older) communication. The result of various inputs by the user can be presented in regions or other areas of a display screen (e.g., "The ranking was low; it will now be changed to high"). These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate information conveyance such as vertical and/or horizontal scroll bars for navigation and toolbar buttons to determine whether a region will be viewable can be employed. For example, the user can interact with a user interface by entering the information into an edit control.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information (e.g., change in ranking and/or classification) in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message (e.g., "Should this be ranked as a low priority?"), producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 5:
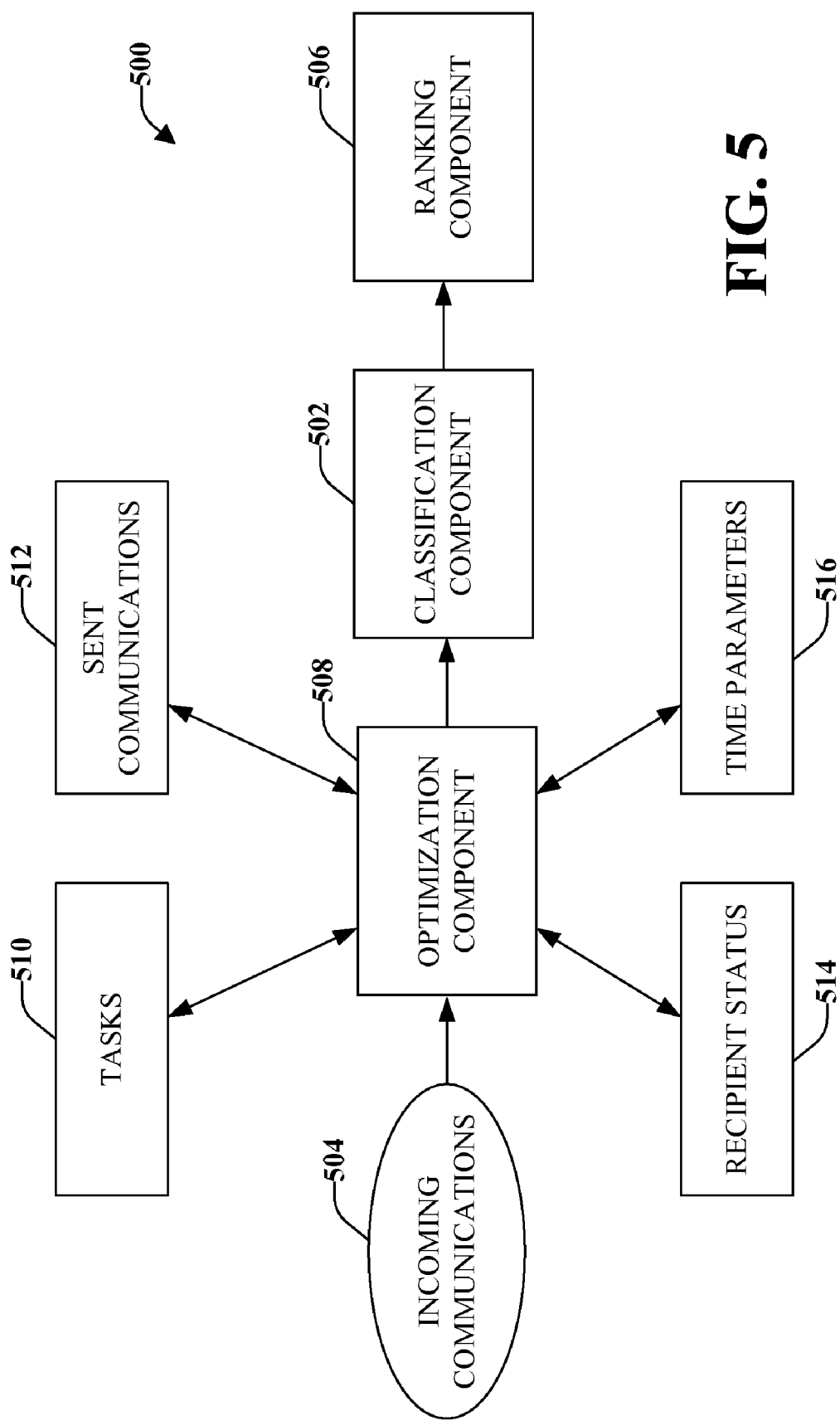
FIG. 5 illustrates a system for assigning significance levels based on extrinsic evidence and/or intrinsic evidence.

Referring now to FIG. 5, illustrated is a system 500 for assigning significance levels based on extrinsic evidence and/or intrinsic evidence. The significance of an incoming communication might differ over time depending on various influences or circumstances occurring that might have an impact of the needs of the recipient. System 500 can obtain information relating to the extrinsic evidence and/or intrinsic evidence and dynamically change a categorization or tagging, assigned by classification component 502, and/or a priority, assigned by ranking component 506, based on the relationship of the evidence on a received communication 504.

To facilitate interpretation of extrinsic evidence and/or intrinsic evidence, an optimization component 508 can be configured to actively seek factors that might have significance (e.g., change a priority level) as it relates to the incoming communications 504. Factors can include, but are not limited to, tasks 510, sent communications 512, recipient status 514, and/or time parameters 516. Each factor can be analyzed individually or in conjunction to take advantage of various and changing factors.

Optimization component 508 can be configured to seek or review tasks 510 assigned to the recipient. Such tasks 510 can be maintained in a task list, task database, a "to do" list or other accessible places, such as a calendar. Based on the subject matter of a task or items related to the task (e.g., person who assigned the task, title of the task, and so on), incoming communications 504 that appear to be related to the task can be flagged as important, especially as due dates are approaching. In accordance with some aspects, a user might notify system 500 that a task will be started on a certain date and to maintain all incoming communications relating to the task separately, regardless of a ranking. On the start date, optimization component 508 might dynamically present the user with all received communications relating to the task so it can be started in a timely fashion. This can mitigate the need for the user to perform a search for communications relating to the task.

In accordance with some aspects, an upcoming or past meeting might be accessed by optimization component 508 to determine the subject of the meeting or the participants and prioritize incoming communications based on related information. The communications relating to the meeting might be retained separately from other communications, regardless of the priority given such communications, depending on user instructions.

Optimization component 508 can retain information relating to a sent communication 512. For example, if a user sends a communication, the subject or keywords associated with the communication can be maintained. When an incoming communication is received that includes a similar subject or similar keywords, optimization component 508 can make a determination that the incoming communication might be a higher priority, since it can be related to something the user previously addressed. The determination can be made even if the person to whom the communication was sent is not the sender of the incoming communication.

Additionally or alternatively, optimization component 508 can seek information relating to a status of the recipient 514 and/or time parameters 516. The status 514 might indicate that the recipient is in a meeting, out of the office, on vacation, and so forth. Time parameters 516 might indicate that after a certain time of day the recipient is unavailable. Based on the status 514 and/or time 516, optimization component 508 might prioritize communications differently. For example, user instructions indicate that communications from Ted Bradley are very important and optimization component 508 is aware that the recipient is on vacation for two weeks (e.g., through a calendar item, or manual interaction with system). If a communication is received from Ted Bradley during those two weeks with the keywords "lunch" and "today", optimization component 508 can automatically infer that the email is a low priority since the recipient is gone and will not be able to attend lunch that day. In accordance with some aspects, optimization component 508 can selectively reply to the communication stating that the recipient is on vacation and can automatically delete the communication or move it into a low-priority folder.

Figure 6:
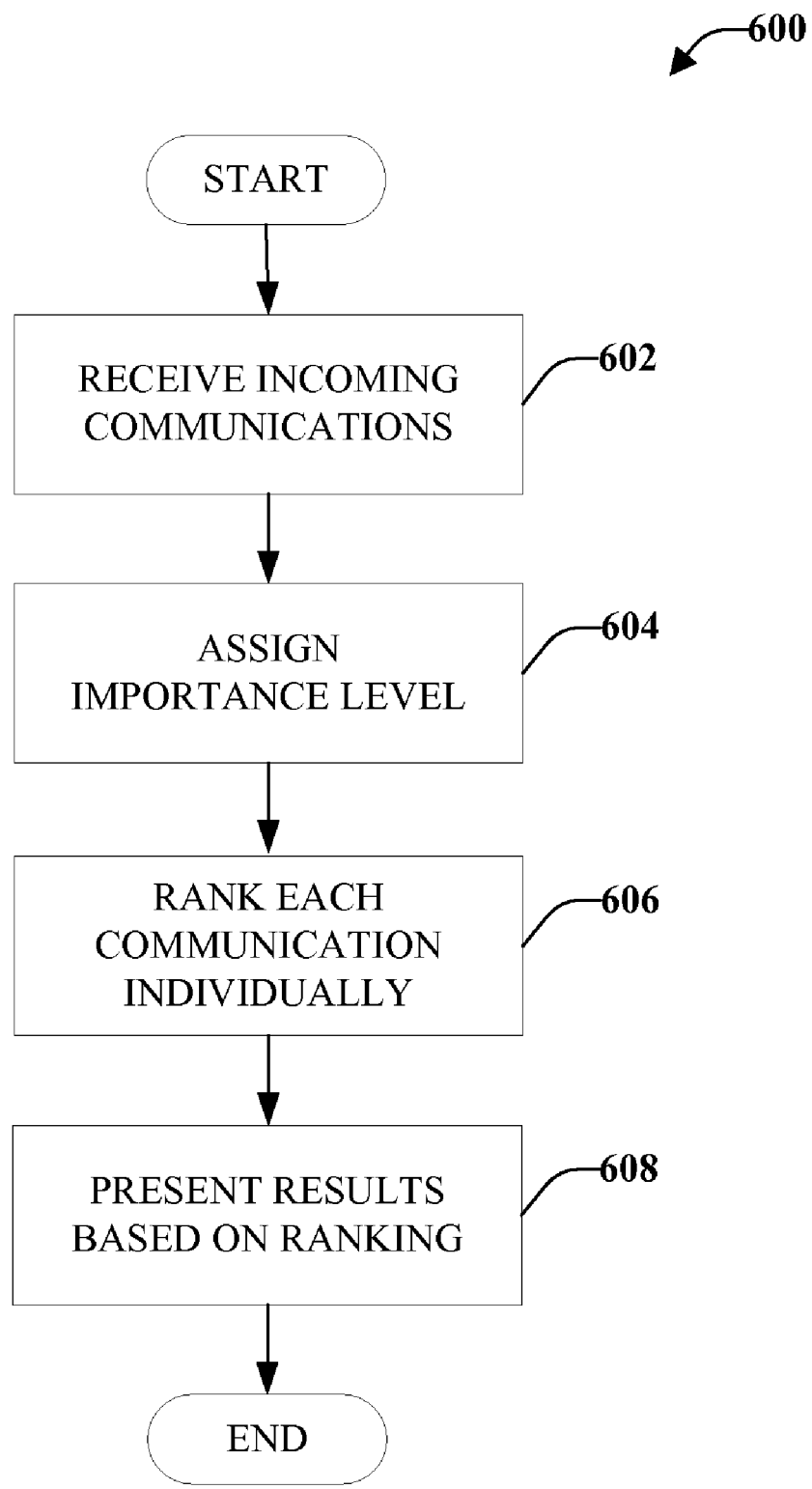
FIG. 6 illustrates a method for dynamically classifying incoming communications and presenting the communications based on the classification.
Figure 7:
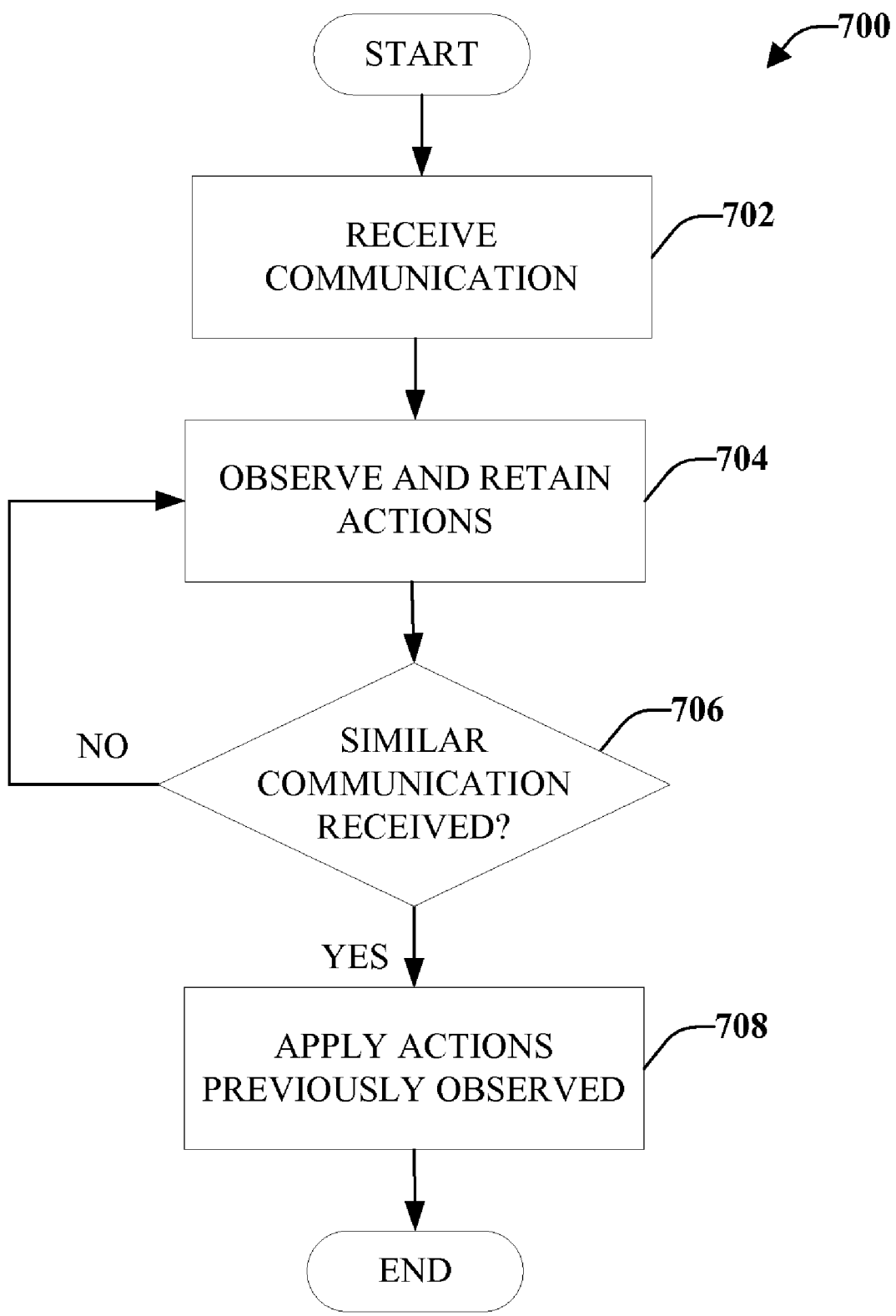
FIG. 7 illustrates a method for automatically learning how to handle incoming communications.
Figure 8:
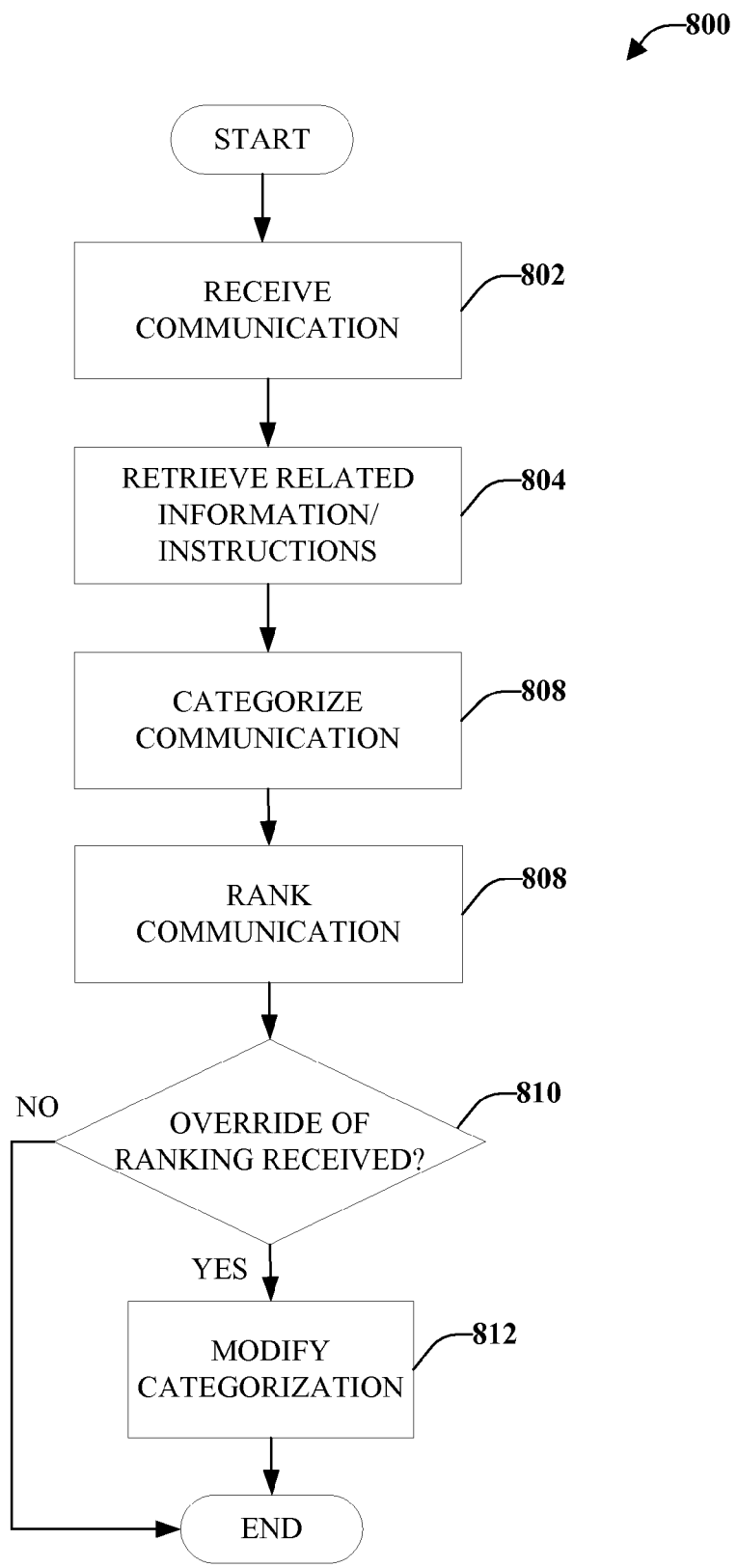
FIG. 8 illustrates a method for determining an importance level and a ranking for received communications.

In view of the exemplary systems shown and described above, methodologies that may be implemented in accordance with the disclosed subject matter, will be better appreciated with reference to the flow charts of FIGS. 6-8. While, for purposes of simplicity of explanation, the methodologies are shown and described as a series of blocks, it is to be understood and appreciated that the disclosed aspects are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 6 illustrates a method 600 for dynamically classifying incoming communications and presenting the communications based on the classification. Recipients of numerous communications can become quickly overwhelmed if each communication needs to be reviewed and answered, deleted, or other functions performed. Method 600 can provide automatic classification of the communications allowing the recipient to selectively address the incoming communications.

Method 600 starts, at 602, when one or more incoming communications are received that are addressed to recipient, either individually or in conjunction with others (e.g., mass email). The recipient could be an individual on the "To" line, or on the "Cc" or "Bcc" line, if such categories are available. In a business scenario, the senders can be internal to an organization or external to the organization (e.g., customers, clients, recruiters, miscellaneous senders). Personal communications can be from friends, family members, requested senders or senders from which the recipient does not want communication.

At 604, each incoming communication is assigned a tag relating to its importance level. The importance level can be based on various criteria including historical data relating to how similar communications were handed, information relating to the sender and/or recipient (e.g., is the sender a supervisor or co-worker, is the recipient a subordinate). Other criteria can include a user instruction (e.g., information from Joe Green is important; information from Steve Silver is not important, communications with keywords "Unified Communications" are very important, and so forth).

Each incoming communication is ranked individually, at 606, based in part on the tagged importance level. For example, the importance level or tagging can be number from "1" to "5", where "1" is the least important and "5" is the most important (although other rankings can be utilized). If the importance level assigned, at 604, is that the communication is a "3", a determination is made, at 606, whether the communication should be placed in an "important" bin or in a "not important" bin (or in another bin). Criteria that can be utilized to make the determination can include how the recipient has handled similar communications in the past or a user instruction. For example, a communication is received from Steve Silver (not important) but the subject line indicates it is relating to "Unified Communications (very important)). As such, the ranking might be a "3" or "4" rather than a "1" because of the keywords included in the subject line or body of the communication. However, other factors can be utilized to determine the rankings of each communication relative to the other communications received.

The results based on the ranking are selectively presented to the recipient, at 608. Communications ranked higher than a determined ranking (e.g., over 3) might be displayed or output in other forms (e.g., audibly) at substantially the same time as it is received. Communications ranked low (e.g., under 3) might be placed in a separate folder or area. Medium level communications (e.g., 3) might be placed in a third area or folder. In accordance with some aspects, the communications can be color coded, wherein a first color (e.g., green) is for important items, and a second color (e.g., red) is for items that are not important and for other communications (e.g., medium level) a third color (e.g., yellow) might be utilized. It should be understood that any number of rankings or indications could be utilized with the disclosed aspects. For example, a user can define communications in a manner that is personally relevant, such as "very important" "medium importance" "low importance" "junk", and so forth. Communications can be applied to each definition based on respective rankings and maintained in separate, easily accessible areas, color code differently, or flagged in another manner, provided the rankings are easy for the recipient to understand and act upon.

FIG. 7 illustrates a method 700 for automatically learning how to manage incoming communications. Different individuals can have different needs or interests and significance tagging of incoming communications should be dynamically personalized for each recipient. Since the needs and/or interests of each individual can be different, method 700 can automatically observe and retain actions that can mimic what would be done if each communication had to be analyzed by the individual. Method 700 can observe manual actions and, after a training period is complete, autonomously apply the observed actions.

At 702, a communication can be received and factors relating to the communication can be analyzed and maintained. Such factors can include, the sender, keywords or phrases in a subject line or body of the communication, the placement of the recipient in an address area (e.g., "To", "Cc", "Bcc"), as well as other information or combinations thereof.

Behaviors observed or manual actions performed by a recipient of the communication are observed and retained, at 704. Such actions can include opening the communication and performing a second action (e.g., replying, flagging for follow up, deleting, and so forth). Another action can be opening the file and observing the user pausing or looking at the email for a length of time (e.g., 1 second, 30 seconds, 2 minutes, and so on) and then performing another action (e.g., closing the communication without replying, replying, deleting, moving to a folder or other area, and so forth). Other actions can include not opening the communication until a later time (e.g., other communications received later are opened first) and/or deleting the communication without opening it. The observed actions can be retained along with information analyzed, at 702, and patterns can be established (e.g., incoming communications with recipient not in the "To" line are not opened until later, communications from Timothy Roads are deleted upon receipt, and so forth). As such, the actions that the recipient would perform upon receiving similar communications can be mimicked.

At 706, a subsequent communication is received (e.g., after a training period or during a trial to see how well method 700 performs) and a determination is made whether the communication is similar to a previously received communication. If the communication is not similar ("NO"), method 700 can continue, at 704, with observance and retention of a manual action. If the communication is similar ("YES"), actions previously observed can be applied, at 708. As such, method 700 can learn the actions that the recipient would perform and dynamically apply those actions, mitigating the need for the recipient to perform a review (cursory or in depth) of the communication. Over time, method 700 can autonomously infer actions based on similar patterns and continuously learn as the recipient overrides actions (e.g., changing a not important communication to an important communication, lowering ranking of a communication, and so forth) and/or based on instructions, which can change over time. As a ranking level is manually changed, a ranking associated with related and/or similar communications (received before or after the manual change, or both before and after the manual change) can be modified in a similar manner.

FIG. 8 illustrates a method 800 for determining an importance level and a ranking for received communications. Method 800 can rank each incoming communication based on its relevance to the recipient at the time of receipt. Thus, method 800 can facilitate receipt of important communications while mitigating the need for the recipient to review a communication for a sender and subject matter and/or performing a more thorough analysis.

Method 800 starts at 802, when a communication is received and criteria included in the communication is reviewed. The analyzed criteria can include keywords or phrases, subject line, sender name, and other information. Information relating to previous communications and/or user instructions is retrieved, at 804. The retrieved information can be utilized to categorize the communication, at 806. Such categorization can include tagging the item with various indicators, such as important, very important, not important, and so forth. Based on the categorization, at 808, each communication is ranked or prioritized in importance as compared to the other received communications. The communication can be selectively presented to the recipient based on the ranking.

At 810, a determination is made whether the recipient modified or overrode the ranking, which might indicate that the ranking applied by method 800 was incorrect. If the determination is that the ranking was acceptable ("NO"), the method 800 can end until a next communication is received, at 802. If the determination is that the ranking was not acceptable ("YES"), the categorization and/or ranking can be selectively modified based on the manual changes.

In accordance with some aspects, information can be solicited from the recipient to determine why a modification was made. For example, an instruction might indicate that all communications from "Paul Smith" are very important. However, an incoming communication from Paul Smith, ranked as important by method 800 is deleted by the user, without opening the communication. Method 800 can request feedback from the user by asking a question such as, "Should all information from Paul Smith be deleted/ranked as not important." The recipient can answer, such as by selecting a "Yes" or "No" response. In this situation, the communication might have been deleted because it contained pictures of Paul Smith's family vacation, which recipient does not care to view. However, other communications from Paul Smith might still be very important.

In accordance with some aspects, if the relevance of a particular communication is changed by the user (e.g., instructions) and previous communications were received and marked with a different, lower ranking, such communications can be dynamically presented. For example, an instruction indicates that communications with the keywords "Rib Cook-Off" are not important and such communications are placed into a not-important folder or area. The recipient then realizes that important clients will be present at the Cook-Off and changes the instructions to indicate that such communications are important. Method 800 can dynamically review the communications previously marked not important and can notify recipient of the communications, even though such communications might have been received earlier (e.g., days, weeks). Thus, recipient can be aware of the communications that were previously labeled as not important and thus, can mitigate the need for the recipient to review previous communications for the information that is now important.

It will be appreciated that, in accordance with one or more aspects described herein, inferences can be made regarding categorization of incoming communications, ranking of communications as compared to other communications, an action a recipient would perform, a change in importance level of incoming communications and so forth. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Artificial intelligence based systems (e.g., explicitly and/or implicitly trained classifiers), rules-based logic systems or other machine learning techniques can be employed in connection with performing inference and/or probabilistic determinations and/or statistical-based determinations as in accordance with one or more of the disclosed aspects.

According to an example, one or more aspects presented above can include making inferences pertaining to what a recipient of the communication would do if the recipient were presented with the incoming communication. In accordance with another example, an inference can be made related to whether a recipient might be interested in a communication previously ranked as not important based on further information obtained relating to the recipients interests or desires. It will be appreciated that the foregoing examples are illustrative in nature and are not intended to limit the number of inferences that can be made or the manner in which such inferences are made in conjunction with the various aspects described herein.

Figure 9:
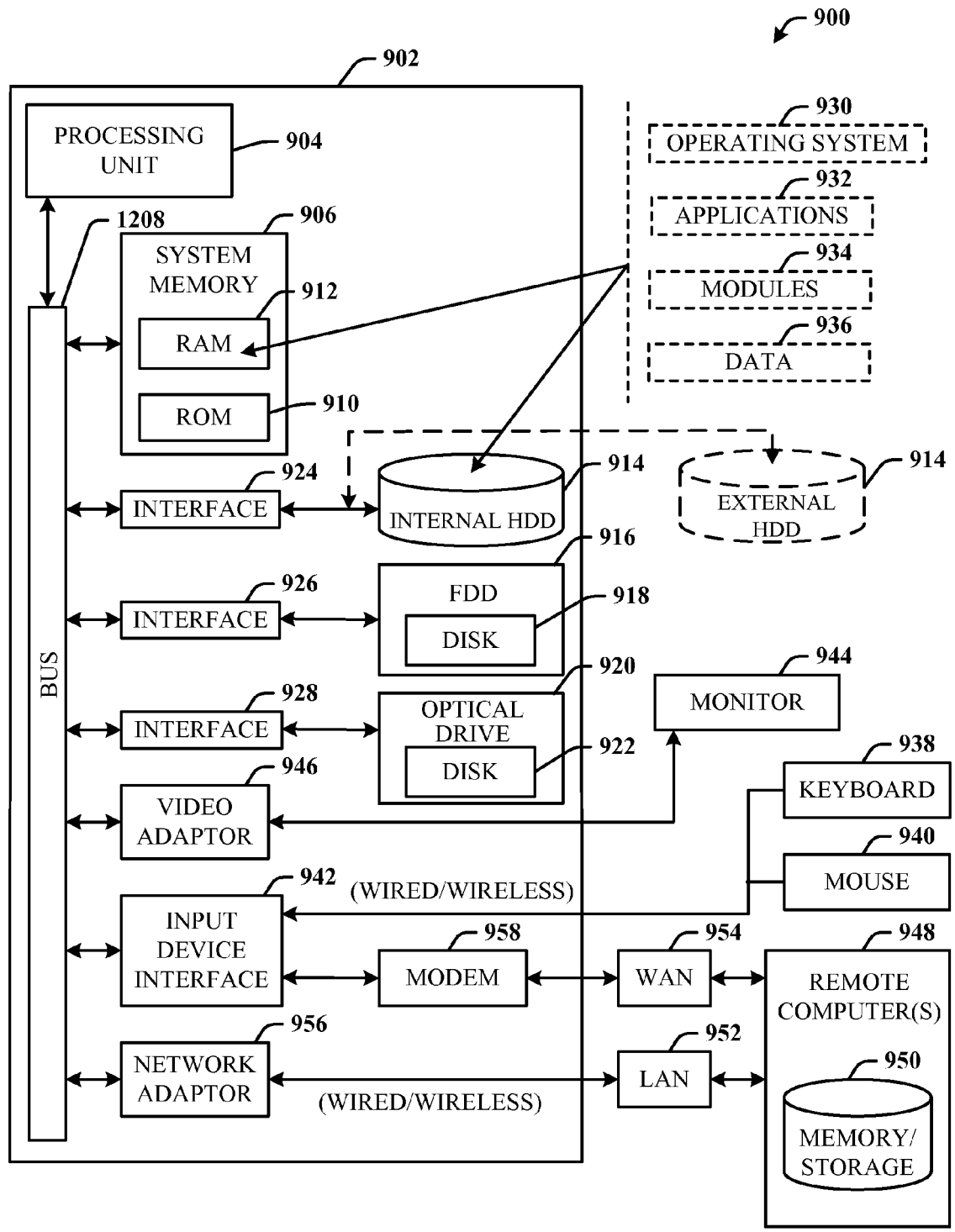
FIG. 9 illustrates a block diagram of a computer operable to execute the disclosed aspects.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various aspects can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
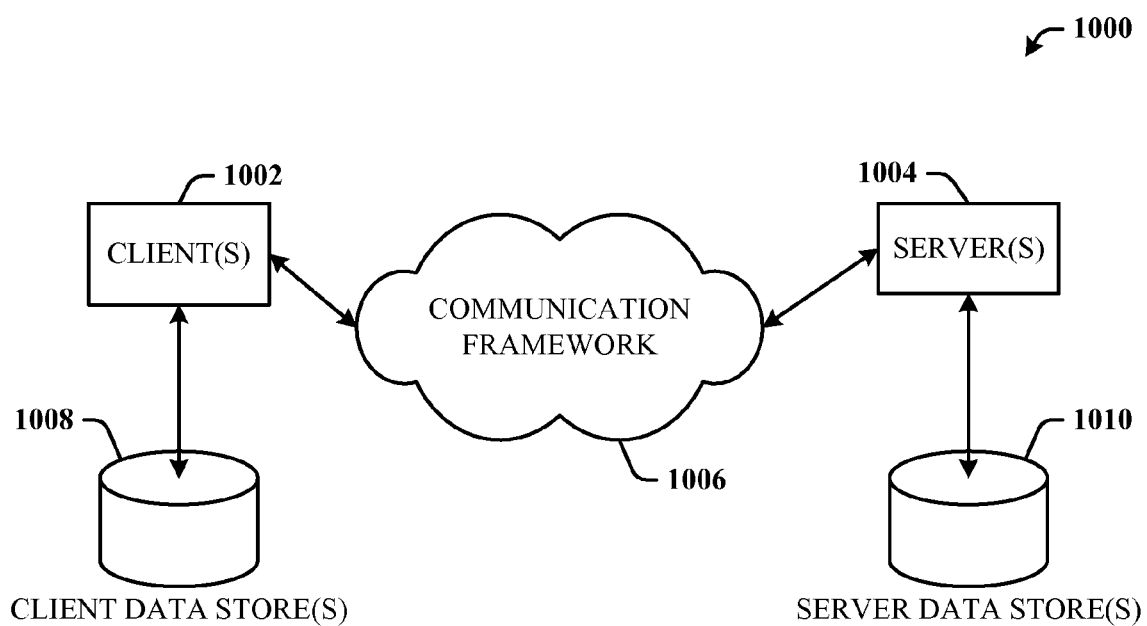
FIG. 10 illustrates a schematic block diagram of an exemplary computing environment operable to execute the disclosed aspects.

Referring now to FIG. 10, there is illustrated a schematic block diagram of an exemplary computing environment 1000 in accordance with the various aspects. The system 1000 includes one or more client(s) 1002. The client(s) 1002 can be hardware and/or software (e.g., threads, processes, computing devices). The client(s) 1002 can house cookie(s) and/or associated contextual information by employing the various aspects, for example.

The system 1000 also includes one or more server(s) 1004. The server(s) 1004 can also be hardware and/or software (e.g., threads, processes, computing devices). The servers 1004 can house threads to perform transformations by employing the various aspects, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A processor-implemented method for automatically managing incoming communications, the method comprising:
   receiving a first communication;
   analyzing identifying factors of the first communication;
   observing a behavior of a recipient on the first communication, wherein the behavior includes one or more actions performed upon the first communication, the one or more actions being manually directed by a user;
   receiving a second communication;
   analyzing identifying factors of the second communication;
   based upon the identifying factors of the first and of the second communications,
   determining whether the second communication is similar to the first communication,
   wherein similarity of the first and the second communications is based upon the identifying factors of the first and of the second communications, wherein the first and the second communications are determined to be similar when one or more of the following identifying factors match between the first and the second communications: a sender of each communication, keywords or phrases in a subject line of each communication, keywords or phrases in a body of each communication, the placement of the recipient in an address area of each communication, or combinations thereof; and
   in response to a determination that the second communication is similar to the first communication, selectively applying the observed behavior to the second communication, wherein the applied observed behavior includes performing the one or more actions that were performed upon the first communication, wherein the one or more actions performed upon the second communication as part of the applied observed behavior include opening the second communication, flagging the second communication, deleting the second communication, moving the second communication to a designated folder, performing a designated action on the second communication at least for a defined period of time before performing any other action on the second communication, or performing a designated action on the second communication at least for a defined period of time before performing another designated action on the second communication.

2. The processor-implemented method of claim 1, wherein the identifying factors of the first or the second communications include one or more of a sender, keywords or phrases in a subject line or body of the communication, the placement of the recipient in an address area, or combinations thereof.

3. The processor-implemented method of claim 1, wherein the one or more actions performed upon the first communication include opening the first communication, flagging the first communication, deleting the first communication, moving the first communication to a designated folder, performing a designated action on the first communication at least for a defined period of time before performing any other action on the first communication, or performing a designated action on the first communication at least for a defined period of time before performing another designated action on the first communication.

4. The processor-implemented method of claim 1, the method further comprising:
   ranking the first communication based on the observed behavior;
   selectively outputting the ranked communication to a user;
   receiving a manual override of the ranked communication;
   modifying a subsequent ranking, a previous ranking, or combinations thereof based on the manual override.

5. The processor-implemented method of claim 1, wherein one or more of the actions of the ordered series of multiple actions are performed after a defined time interval.

6. The processor-implemented method of claim 1, wherein one or more of the actions of the ordered series of multiple actions are performed after a defined time interval.

7. The processor-implemented method of claim 1, the operations further comprising:
   ranking the first communication based on the observed behavior;
   selectively outputting the ranked communication to a user;
   receiving a manual override of the ranked communication;
   modifying a subsequent ranking, a previous ranking, or combinations thereof based on the manual override.

8. One or more computer-readable storage media having computer executable instructions thereon which, when executed by one or more computing devices, direct the one or more computing devices to perform operations for automatically managing incoming communications with an importance level, the operations comprising:
   receiving the incoming communications, which include a first communication and a second communication;
   analyzing identifying factors of the incoming communications;
   observing a behavior of a recipient on the first communication, wherein the behavior includes one or more actions performed upon the first communication, the one or more actions being manually directed by a user;
   based upon the identifying factors of the first and of the second communications,
   determining whether the second communication is similar to the first communication,
   wherein similarity of the first and the second communications is based upon the identifying factors of the first and of the second communications, wherein the first and the second communications are determined to be similar when one or more of the following identifying factors match between the first and the second communications: a sender of each communication, keywords or phrases in a subject line of each communication, keywords or phrases in a body of each communication, the placement of the recipient in an address area of each communication, or combinations thereof; and in response to a determination that the second communication is similar to the first communication, selectively applying the observed behavior to the second communication, wherein the applied observed behavior includes performing the one or more actions that were performed upon the first communication, wherein the one or more actions performed upon the second communication as part of the applied observed behavior include opening the second communication, flagging the second communication, deleting the second communication, moving the second communication to a designated folder, performing a designated action on the second communication at least for a defined period of time before performing any other action on the second communication, or performing a designated action on the second communication at least for a defined period of time before performing another designated action on the second communication.

9. One or more computer-readable storage media of claim 8, wherein the identifying factors of the first or the second communications include one or more of a sender, keywords or phrases in a subject line or body of the communication, the placement of the recipient in an address area, or combinations thereof.

10. One or more computer-readable storage media of claim 8, wherein the one or more actions performed upon the first communication include opening the first communication, flagging the first communication, deleting the first communication, moving the first communication to a designated folder, performing a designated action on the first communication at least for a defined period of time before performing any other action on the first communication, or performing a designated action on the first communication at least for a defined period of time before performing another designated action on the first communication.

11. One or more computer-readable storage media having computer executable instructions thereon which, when executed by one or more computing devices, direct the one or more computing devices to perform operations for automatically managing incoming communications with an importance level, the operations comprising:

receiving a first communication;

analyzing identifying factors of the first communication;

observing a behavior of a recipient on the first communication, wherein the behavior includes a series of multiple actions performed upon the first communication in a defined order, the series of multiple actions being manually directed by a user;

receiving a second communication;

analyzing identifying factors of the second communication; based upon the identifying factors of the first and of the second communications, determining whether the second communication is similar to the first communication, wherein similarity of the first and the second communications is based upon one or more of the following identifying factors matching between the first and the second communications: a sender of each communication, keywords or phrases in a subject line of each communication, keywords or phrases in a body of each communication, the placement of the recipient in an address area of each communication, or combinations thereof;

in response to a determination that the second communication is similar to the first communication, selectively applying the observed behavior to the second communication, wherein the applied observed behavior includes performing the ordered series of multiple actions that were performed upon the first communication, opening the second communication, flagging the second communication, deleting the second communication, moving the second communication to a designated folder, performing a designated action on the second communication at least for a defined period of time before performing any other action on the second communication, or performing a designated action on the second communication at least for a defined period of time before performing another designated action on the second communication; and assigning an importance level to each of the incoming communications individually;

overriding, by input from a user, the importance level by manually changing the importance level of one or more of the incoming communications; and presenting results based on the ranking, wherein the presenting includes:

outputting the one or more incoming communications to the user at about the same time as the incoming communications are received if the importance level is high; and retaining the one or more incoming communications in a separate location if the importance level of the one or more incoming communications is low.

* * * * *